US008050998B2

(12) United States Patent
Bolivar et al.

(10) Patent No.: US 8,050,998 B2
(45) Date of Patent: Nov. 1, 2011

(54) FLEXIBLE ASSET AND SEARCH RECOMMENDATION ENGINES

(75) Inventors: Alvaro Bolivar, Santa Clara, CA (US); Sunil Mohan, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 886 days.

(21) Appl. No.: 11/740,352

(22) Filed: Apr. 26, 2007

(65) Prior Publication Data

US 2008/0270250 A1 Oct. 30, 2008

(51) Int. Cl.
*G06Q 40/00* (2006.01)
(52) U.S. Cl. ............................. 705/37; 705/35
(58) Field of Classification Search ............... 705/37, 705/35
See application file for complete search history.

(56) References Cited

U.S. PATENT DOCUMENTS

| | | |
|---|---|---|
| 4,996,642 A | 2/1991 | Hey |
| 5,310,997 A | 5/1994 | Roach et al. |
| 5,583,763 A | 12/1996 | Atcheson et al. |
| 5,749,081 A | 5/1998 | Whiteis |
| 5,790,426 A | 8/1998 | Robinson |
| 5,790,790 A | 8/1998 | Smith et al. |
| 5,825,881 A | 10/1998 | Colvin, Sr. |
| 5,842,199 A | 11/1998 | Miller et al. |
| 5,845,265 A | 12/1998 | Woolston |
| 5,884,282 A | 3/1999 | Robinson |
| 5,897,622 A | 4/1999 | Blinn et al. |
| 6,016,475 A | 1/2000 | Miller et al. |
| 6,041,311 A | 3/2000 | Chislenko et al. |
| 6,047,264 A | 4/2000 | Fisher et al. |
| 6,049,777 A | 4/2000 | Sheena et al. |
| 6,055,513 A | 4/2000 | Katz et al. |
| 6,061,448 A | 5/2000 | Smith et al. |
| 6,064,980 A | 5/2000 | Jacobi et al. |
| 6,085,176 A | 7/2000 | Woolston |
| 6,085,229 A | 7/2000 | Newman et al. |
| 6,092,049 A | 7/2000 | Chislenko et al. |
| 6,101,484 A | 8/2000 | Halbert et al. |
| 6,101,486 A | 8/2000 | Roberts et al. |
| 6,108,493 A | 8/2000 | Miller et al. |
| 6,119,101 A | 9/2000 | Peckover |
| 6,119,137 A | 9/2000 | Smith et al. |
| 6,169,986 B1 | 1/2001 | Bowman et al. |

(Continued)

FOREIGN PATENT DOCUMENTS

EP 0957437 A2 11/1999

(Continued)

OTHER PUBLICATIONS

Andale Gallery, "Andale", www.andale.com/corp/products/gallery.jsp,(Printed May 21, 2002).

(Continued)

*Primary Examiner* — Lindsay M. Maguire
(74) *Attorney, Agent, or Firm* — Schwegman, Lundberg & Woessner, P.A.

(57) ABSTRACT

The subject mater herein relates to Internet-based commerce and, more particularly, to a flexible asset and search recommendation engines. Various embodiments herein provide systems, methods, and software to identify relationships between assets and provide asset recommendations as a function of the identified relationships. In some embodiments, relationships between assets are identified by gathering statistics including a probability of an action in view of one or more other actions an entity may have performed.

11 Claims, 6 Drawing Sheets

U.S. PATENT DOCUMENTS

| | | | |
|---|---|---|---|
| 6,178,408 B1 | 1/2001 | Copple et al. |
| 6,192,407 B1 | 2/2001 | Smith et al. |
| 6,195,657 B1 | 2/2001 | Rucker et al. |
| 6,202,051 B1 | 3/2001 | Woolston |
| 6,243,691 B1 | 6/2001 | Fisher et al. |
| 6,246,997 B1 | 6/2001 | Cybul et al. |
| 6,266,649 B1 | 7/2001 | Linden et al. |
| 6,308,168 B1 | 10/2001 | Dovich et al. |
| 6,313,745 B1 | 11/2001 | Suzuki |
| 6,317,722 B1 | 11/2001 | Jacobi et al. |
| 6,321,221 B1 | 11/2001 | Bieganski |
| 6,334,127 B1 | 12/2001 | Bieganski et al. |
| 6,356,879 B2 | 3/2002 | Aggarwal et al. |
| 6,360,216 B1 | 3/2002 | Hennessey et al. |
| 6,370,513 B1 | 4/2002 | Kolawa et al. |
| 6,412,012 B1 | 6/2002 | Bieganski et al. |
| 6,415,270 B1 | 7/2002 | Rackson et al. |
| 6,438,579 B1 | 8/2002 | Hosken |
| 6,466,918 B1 | 10/2002 | Spiegel et al. |
| 6,484,149 B1 | 11/2002 | Jammes et al. |
| 6,487,539 B1 | 11/2002 | Aggarwal et al. |
| 6,615,247 B1 | 9/2003 | Murphy |
| 6,636,836 B1 | 10/2003 | Pyo |
| 6,687,696 B2 | 2/2004 | Hofmann et al. |
| 6,772,150 B1 | 8/2004 | Whitman et al. |
| 6,782,370 B1 | 8/2004 | Stack |
| 6,785,671 B1 | 8/2004 | Bailey et al. |
| 6,801,909 B2 | 10/2004 | Delgado et al. |
| 6,813,775 B1 | 11/2004 | Finseth et al. |
| 6,853,982 B2 | 2/2005 | Smith et al. |
| 6,865,546 B1 | 3/2005 | Song |
| 6,912,505 B2 | 6/2005 | Linden et al. |
| 6,963,848 B1 | 11/2005 | Brinkerhoff |
| 6,963,850 B1 | 11/2005 | Bezos et al. |
| 7,016,863 B1 | 3/2006 | Kamakura et al. |
| 7,117,163 B1 | 10/2006 | Iyer et al. |
| 7,127,441 B2 * | 10/2006 | Musman | 706/47 |
| 7,469,239 B2 * | 12/2008 | Musman | 706/46 |
| 7,590,562 B2 * | 9/2009 | Stoppelman | 705/26 |
| 7,672,877 B1 * | 3/2010 | Acton et al. | 705/27 |
| 2001/0021914 A1 | 9/2001 | Jacobi et al. |
| 2001/0021921 A1 | 9/2001 | Kan et al. |
| 2001/0037255 A1 | 11/2001 | Tambay et al. |
| 2001/0037259 A1 | 11/2001 | Sharma et al. |
| 2001/0044758 A1 | 11/2001 | Talib et al. |
| 2001/0056395 A1 | 12/2001 | Khan |
| 2002/0022994 A1 | 2/2002 | Miller et al. |
| 2002/0026386 A1 | 2/2002 | Walden |
| 2002/0052873 A1 | 5/2002 | Delgado et al. |
| 2002/0055890 A1 | 5/2002 | Foley |
| 2002/0055903 A1 * | 5/2002 | Solomon | 705/37 |
| 2002/0059116 A1 | 5/2002 | Bulatovic et al. |
| 2002/0062268 A1 | 5/2002 | Sato et al. |
| 2002/0065877 A1 | 5/2002 | Kowtko et al. |
| 2002/0099629 A1 | 7/2002 | Sato et al. |
| 2002/0103692 A1 | 8/2002 | Rosenberg et al. |
| 2002/0138331 A1 | 9/2002 | Hosea et al. |
| 2002/0143660 A1 | 10/2002 | Himmel et al. |
| 2002/0147628 A1 | 10/2002 | Specter et al. |
| 2002/0156686 A1 | 10/2002 | Kraft et al. |
| 2002/0161664 A1 | 10/2002 | Shaya et al. |
| 2002/0174428 A1 | 11/2002 | Agnihotri et al. |
| 2002/0184116 A1 | 12/2002 | Tam et al. |
| 2002/0198882 A1 | 12/2002 | Linden et al. |
| 2003/0028427 A1 | 2/2003 | Dutta et al. |
| 2003/0037041 A1 | 2/2003 | Hertz |
| 2003/0050863 A1 | 3/2003 | Radwin |
| 2003/0051240 A1 | 3/2003 | Schaffer et al. |
| 2003/0055831 A1 | 3/2003 | Ryan et al. |
| 2003/0061122 A1 | 3/2003 | Berkowitz et al. |
| 2003/0069740 A1 | 4/2003 | Zeidman |
| 2003/0084450 A1 | 5/2003 | Thurston et al. |
| 2003/0093331 A1 | 5/2003 | Childs et al. |
| 2003/0093793 A1 | 5/2003 | Gutta |
| 2003/0105682 A1 | 6/2003 | Dicker et al. |
| 2003/0110056 A1 | 6/2003 | Berghofer et al. |
| 2003/0131070 A1 | 7/2003 | Stroebel et al. |
| 2003/0145326 A1 | 7/2003 | Gutta et al. |
| 2003/0163453 A1 | 8/2003 | Yang et al. |
| 2003/0182196 A1 | 9/2003 | Huang |
| 2003/0182249 A1 | 9/2003 | Buczak |
| 2003/0208399 A1 | 11/2003 | Basak et al. |
| 2003/0217332 A1 | 11/2003 | Smith et al. |
| 2003/0233655 A1 | 12/2003 | Gutta et al. |
| 2004/0039657 A1 | 2/2004 | Behrens et al. |
| 2004/0078214 A1 | 4/2004 | Speiser et al. |
| 2004/0143450 A1 | 7/2004 | Vidali |
| 2004/0143584 A1 | 7/2004 | Chun et al. |
| 2004/0230499 A1 | 11/2004 | Stack |
| 2004/0260621 A1 | 12/2004 | Foster et al. |
| 2004/0267613 A1 | 12/2004 | Chan et al. |
| 2005/0028207 A1 | 2/2005 | Finseth et al. |
| 2005/0038717 A1 | 2/2005 | McQueen et al. |
| 2005/0055713 A1 | 3/2005 | Lee et al. |
| 2005/0125240 A9 | 6/2005 | Speiser et al. |
| 2005/0144086 A1 | 6/2005 | Speiser et al. |

FOREIGN PATENT DOCUMENTS

| | | | |
|---|---|---|---|
| WO | WO-0017792 A1 | 3/2000 |
| WO | WO-0017793 A1 | 3/2000 |
| WO | WO-0033628 A1 | 6/2000 |
| WO | WO-0045319 A1 | 8/2000 |
| WO | WO-0062223 A1 | 10/2000 |
| WO | WO-0106398 A2 | 1/2001 |
| WO | WO-0116848 A2 | 3/2001 |
| WO | WO-0129726 A2 | 4/2001 |
| WO | WO-0131537 A2 | 5/2001 |
| WO | WO-0133401 A2 | 5/2001 |
| WO | WO-0219203 A2 | 3/2002 |
| WO | WO-0229695 A1 | 4/2002 |
| WO | WO-0237926 A2 | 5/2002 |
| WO | WO-03043333 A1 | 5/2003 |
| WO | WO-03081473 A1 | 10/2003 |
| WO | WO-2004017178 A2 | 2/2004 |
| WO | WO-2004109544 A1 | 12/2004 |
| WO | WO-2008133791 A2 | 11/2008 |
| WO | WO-2008133791 A3 | 11/2008 |

OTHER PUBLICATIONS

Andale Gallery, "Gallery—Cross Sell More Items", http://cms.andale.com/corp/products/gallery.jsp (also http://cms.andale.com/auction/gallery.html), Accessed on Web Apr. 15, 2005,(Copyright 1999-2005),Web Page.

Andale Gallery, "Prominently Featured on Your Listings", http://www.andale.com/corp/tour/gal_tour4.html, Accessed on Web—Apr. 15, 2005,(Copyright 2001),Web Page.

Ansari, A., "Internet Recommendation System", *Journal of Marketing Research*, vol. 37(3), Proquest #57914570,(Aug. 2000),363.

Ardissono, Liliana, et al., "Tailoring the Interaction With Users in Electronic Shops", *Proceedings of the Seventh International Conference on User Modeling, Banff, Canada*, (1999),35-44.

Balabanovic, Marko, "An Adaptive Web Page Recommendation Service", *Stanford University Digital Libraries Project Working Paper*, Proceedings of the First International Conference on Autonomous Agents,(1999),378-385.

Breese, John S., et al., "Empirical Analysis of Predictive Algorithms for Collaborative Filtering", *Technical Report MSR-TR-98-12—Microsoft Research*, (May 1998—Revised Oct. 1998),1-21.

Burke, Robin, "The Wasabi Personal Shopper: a case-based recommender system", *Proceedings of the Sixteenth National Conference on Artificial Intelligence and the Eleventh Innovative Applications of Artificial Intelligence Conference Innovative Applications of Artificial Intelligence*, (1999),844-849.

ChangChien, S, "Mining association rules procedure to support online recommendation by customers and product fragmentation", *Expert Systems with Application*, 20(4), (May 2001),325-335.

Cheung, N., "Buy this! [e-commerce recommendation software]", *Information Age*, (Feb. 2001),33-4.

Cheung, W., "Mining customer preference ratings for product recommendation using the support vector machine and the latent class model", *Proceedings of the 2nd International Conference on Data Mining Methods and Databases for Engineering, Finance and Other Fields*, Cambridge, UK, (Jul. 2000),601-10.

Chien, Yi-Ying, "A personalized Internet shopping agent", *Proceedings of the International Conference on Parallel and Distributed Processing Techniques and Applications*. PDPTA'2000, pt. 4, (2000),1849-55.

Chun, In-Gook, et al., "The implementation of knowledge-based recommender system for electronic commerce using Java expert system library", *International Symposium on Industrial Electronics, 2001. Proceedings. ISIE 2001*, vol. 3, (Jun. 12-16, 2001),1766-1770.

Cotlier, Moira, "The Electronic Catalog: Upselling Online Can Raise Top Line", *Catalog Age*, 18(7), (Jun. 1, 2001),93.

Demiriz, Ayhan, "Enhancing Product Recommender Systems on Sparse Binary Data", *E-Business Department, Verizon, Inc.*, (2002),1-17.

Ebizautos, "Better Presentations. Better Results on eBay Motors.", *eBizAutos—eBay Motors Aution Management System for Auto & Motorcycle Dealers*, www.ebizautos.com,(Printed May 21, 2002),1 page.

Ebizautos, "eBay Motors Auction Management System for Auto & Motorcycle Dealers", http://www.ebizautos.com/, (Copyright 2001-2005),Web Page.

Flynn, B., "Next Hot Web Play? Precision Targeting", *Brandweek*, 42(i8), Proquest #68864267.,(Feb. 19, 2001),21(3pgs).

Greco, Carl, "What you should know before joining an Internet Mail", *Direct Marketing*, 61(10), (Feb. 1999),42-3.

Harvey, L, ""On Birthdays" mortgages, ice cream sundaes, and term life. How personalization and corss selling tools provide cross-selling in the enterprise", *E-business Strategies & Solutions*, (Jul. 1999),31-5.

Hirooka, Yasuo, et al., "Extending Content-Based Recommendation by Order-Matching and Cross-Matching Methods", *Lecture Notes In Computer Science*; vol. 1875, *Proceedings of the First International Conference on Electronic Commerce and Web Technologies*, (2000),177-90.

Hirooka, Y, et al., "Recommending books of revealed and latent interests in e-commerce", *Industrial Electronics Society. 2000. IECON 2000. 26th Annual Conference of the IEEE*, vol. 3, 2000 , 1632-1637.

Hong, Se J., et al., "A New Approach for Item Choice Recommendations", *Proceedings of the Third International Conference on Data Warehousing and Knowledge Discovery*, (2001),131-140.

Iacobucci, Dawn, "Recommendation Agents on the Internet", *Journal of Interactive Marketing*, 14(3), (2000),2-11.

IBM, "WebSphere Commerce Professional Edition", *Features at Glance*, www-3.ibm.com/software/webservers/commerce/wc_pe/morefeatures.html,(Printed May 21, 2002),1 page.

Kanemoto, H, "Web Customer Action Analysis System", *Matsushita Technical Journal*, 48(1), (Feb. 2002),26-9.

Karypis, George, "Evaluation of Item-Based Top-N Recommendation Algorithms", *Technical Report #00-046*, http://www-users.cs.umn.edu/~karypis/publications/Papers/PDF/itemrs.pdf,(2000),1-13.

Kitts, Brendan, et al., "Cross-sell: A Fast Promotion-Tunable Customer-item Recommendation Method Based on Conditionally Independent Probabilities", *Proceedings of the sixth ACM SIGKDD international conference on Knowledge discovery and data mining, Boston, MA USA*, (Aug. 2000),437-446.

Kohrs, Arnd, et al., "Using category-based collaborative filtering in the Active WebMuseum", *2000 IEEE International Conference on Multimedia and Expo, 2000. ICME 2000*, vol. 1, (Jul. 30-Aug. 2, 2000),351-354.

Kumar, Ravi, "Recommendation Systems: A Probabilistic Analysis", *Journal of Computer and System Sciences*, 63(1), (Aug. 2001),42-61.

Kwak, Mira, "Collaborative filtering with automatic rating for recommendation", *IEEE International Symposium on Industrial Electronics, 2001. Proceedings. ISIE 2001*, vol. 1, (Jun. 12-16, 2001),625-628.

Kwak, Mary, "Web Sites Learn To Make Smarter Suggestions", *MIT Sloan Management Review*, 42(4), (Summer 2001),17.

Kyeonah, Yu, "Improving the performance of collaborative recommendation by using multi-level similarity computation", *Artificial Intelligence and Soft Computing : Proceedings of the IASTED International Conference.*, (Jul. 24-26, 2000),241-5.

Lee, Wee S., "Collaborative Learning for Recommender Systems", *Proceedings of the Eighteenth International Conference on Machine Learning*, (2001),314-321.

Lin, Weiyang, et al., "Efficient Adaptive-Support Association Rule Mining for Recommender Systems", *Data Mining and Knowledge Discovery*, 6(1), (2001),83-105.

Loney, Fred N., "Faceted Preference Matching in Recommender Systems", *Proceedings of the Second International Conference on Electronic Commerce and Web Technologies*, (2001),295-304.

Maes, Pattie, et al., "Agents that Buy and Sell", *Communications of the ACM* 42(3), (Mar. 1999),81-91.

Maes, Pattie, et al., "Agents that Buy and Sell:", *Transforming Commerence as we Know it*, 1998 MIT Media Laboratory. Submitted to the Communications of the ACM, Mar. 1999 Issue,(1998),12 pgs.

McAllister, Neil, "Getting Personal", *New Architect*, (Nov. 2001),1-8.

McDonald, D W., "Expertise recommender: a flexible recommendation system and architecture", *Proceedings of the 2000 ACM conference on Computer supported cooperative work*, (2000),231-240.

Nextag, "Computer Letter, Private Profiles—NexTag—Of all the auction sites on the Web, here's one an economist might like", http://www.nextag.com/serv/main/about/computer/letter.html, (Aug. 23, 1999).

Pedersen, P., "Behavioral Effects of Using Software Agents for Product and Merchant Brokering: An Experimental Study of Consumer Decision-Making", *International Journal of Electronic Commerce*, 5(1), (Fall 2000),125-141.

Pennock, David M., "Social Choice Theory and Recommender Ststems:", *Analysis of the Axiomatic Foundations of Collaborative Filtering*, In the proceedings of the Seventeenth National Conference on Artifical Intelligence (AAA1-2000),(2000),6 pgs.

Pennock, David M., et al., "Social Choice Theory and Recommender Systems: Analysis of the Axiomatic Foundations of Collaborative Filtering", *Proceedings of the Seventeenth National Conference on Artificial Intelligence and Twelfth Conference on Innovative Applications of Artificial Intelligence*, (2000),729-734.

Ramakrishnan, N, et al., "Privacy risks in recommender systems", *IEEE Internet Computing*, 5(6), (Nov.-Dec. 2001),54-63.

Roe, Andy, "Amazon Adds Seller Services", http://www.auctionwatch.com/awdaily/dailynews/august99/3-081899.html, Accessed through following address—http://web.archive.org/web/20000816024400/http://www.auctionwatch.com/awdaily/dailynews/august99/3-081899.html,(Aug. 18, 1999),Web Page.

Sarwar, B., et al., "Analysis of recommendation algorithms for e-commerce", Proceedings of the 2nd ACM conference on EC, (2000),158-167.

Sarwar, Badrul, et al., "Item-based Collaborative Filtering Recommendation Algorithms", *WWW10 Conference*, (May 1-5, 2001),1-11.

Schafer, J, "E-commerce recommendation applications", *Data Mining and Knowledge Discovery*, 5(1-2), (2001),115-153.

Schafer, J., et al., "E-Commerce Recommendation Applications", *GroupLens & Research Project, Dept. of Computer Science & Engineering, University of Minnesota, Minneapolis*, (2001),1-24.

Schafer, J. B., et al., "Recommender Systems in E-Commerce", *Department of Science and Engineering—University of Michigan*, (2001),1-9.

Schien, Andrew I., et al., et al., "Methods and Metrics for Cold-Start Recommendations", *Proceedings of the 25th Annual International ACM SIGIR Conference on Research and Development in Information Retrieval* (SIGIR 2002), (2002),1-9.

Schubert, Petra, "Virtual Communities of Transaction:The Role of Personalization in Electronic Commerce", *Electronic Markets Journal*, 10(1), (2000),1-13.

Seitz, Juergen, et al., "Impacts of Software Agents in E-Commerce Systems on Customer's Loyalty and on Behavior of Potential Customers", *Chapter 13 from Strategies for e-Commerce Success: by Bijan FazIollahi*, IRM Press,(2000),9 pgs.

Towle, Brendon, et al., "Knowledge Based Recommender Systems Using Explicit User Models", *Knowledge Based Electronic Markets*, 2000 ,74-7.

Tran, T., "Hybrid Recommender Systems for Electronic Commerce", *Proceedings of the Seventeenth National Conference on Artificial Intelligence (AAAI-00) Workshop on Knowledge-Based Electronic Markets*, (2000), 78-84.

Websphere, "WebSphere Commerce Professional Edition—Features", http://www-306.ibm.com/software/genservers/commerce/wcpe/, (Downloaded Apr. 21, 2005), Webpage.

Wilder, C, et al., "E-Commerce Emerges", *Information Week*, No. 584, (Jun 17, 1996), 14-15.

"Application Serial No. PCT/US2008/003875, International Search Report and Written Opinion Mailed Oct. 20, 2008", 13 pgs.

Claypool, Mark, et al., "Inferring User Interest (Aug. 2001)", Computer Science Technical Report Series, (Aug. 31, 2001), 1-17.

Claypool, Mark, et al., "Inferring User Interest (May 2001)", Computer Science Technical Report Series, Worcester Polytechnic Institute, (May 11, 2001), 24 Pages.

\* cited by examiner

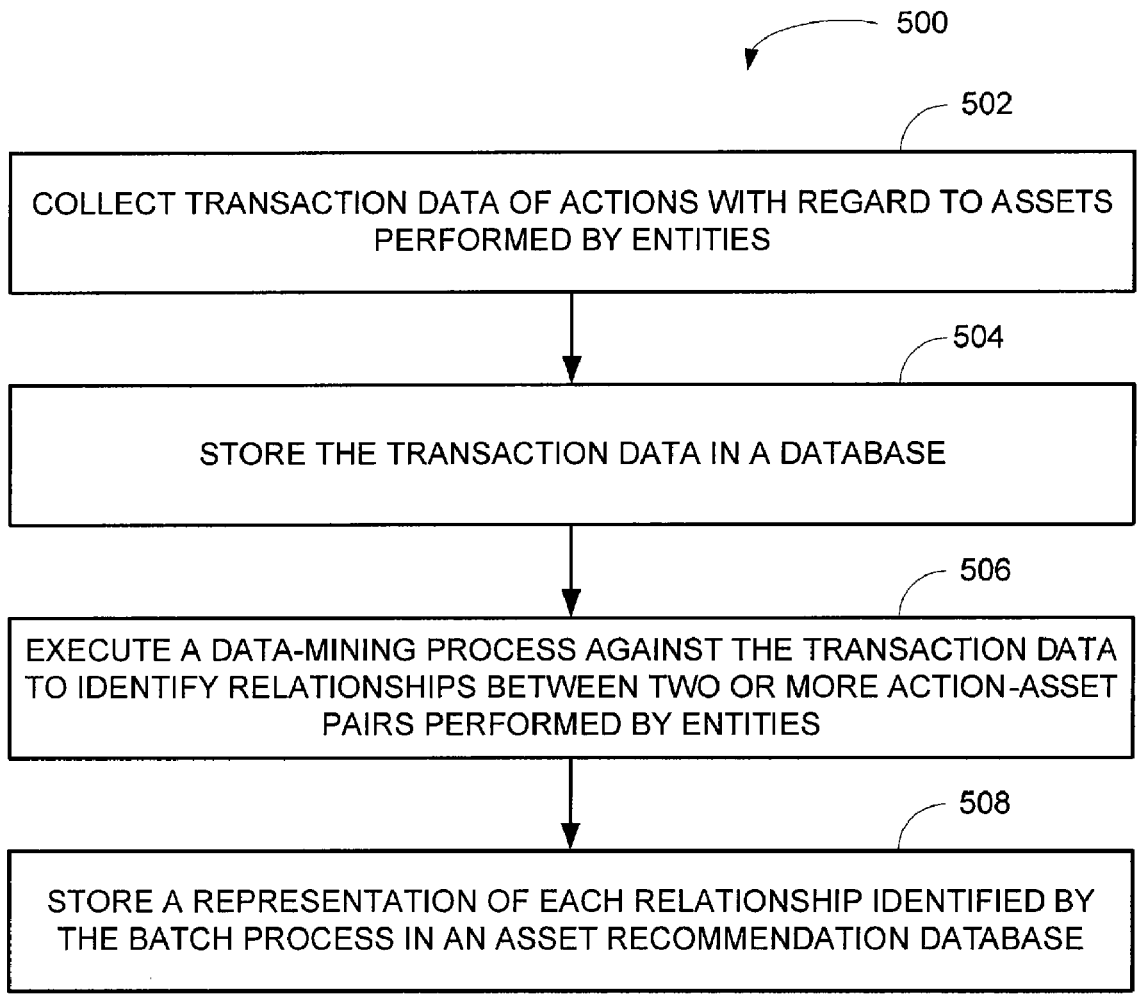

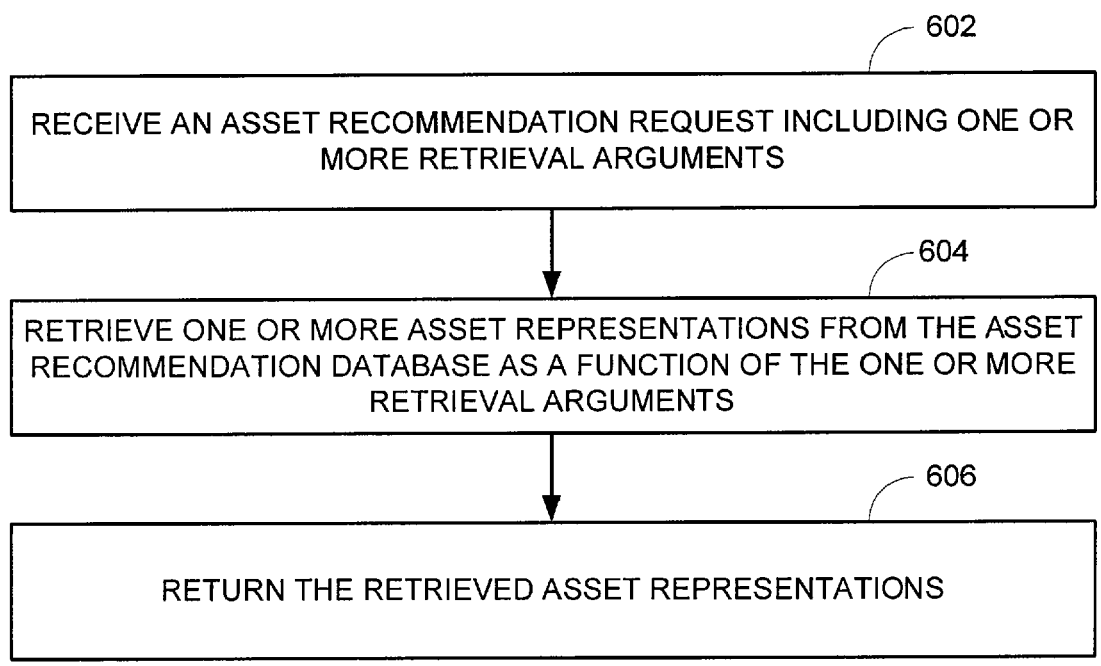

FLEXIBLE ASSET AND SEARCH RECOMMENDATION ENGINES

TECHNICAL FIELD

The subject mater herein relates to Internet-based commerce and, more particularly, to a flexible asset and search recommendation engines.

BACKGROUND INFORMATION

Today, many goods and services are offered for sale on the Internet. Consumers are provided with unprecedented product access. Also, sellers are provided with significantly increased market reach to consumers that were previously unreachable to them. However, as a result of increased access, where consumers in a conventional bricks-and-mortar shopping environment may have had only a single source from which to procure a single product to meet a certain need, consumers are now confronted with multiple sources of multiple products to meet that same need. Further, consumers commonly have access to products that may meet an unrealized need. Also, with so many products being offered, the task of finding a product of interest and learning about the availability of such products is becoming an evermore daunting task. What is also lost when shopping via the Internet is the ability to just browse the aisles where products are placed according to likely interest of consumers who would be in a certain aisle.

Consumers are faced with even more issues as a result of increased product and seller access. For example, consumers may not be aware of manufacturer or seller product quality and service reputations. The lack of such knowledge results in poor consumer experiences and reluctance to purchase goods and services from any Internet seller. Further, reputable manufacturers and sellers may lose sales to those who are less reputable. As a result, the integrity and health of the Internet marketplace and eventually consumers may lose their newly found options.

Sellers are also faced with unique issues. Product placement in brick-and-mortar stores has historically driven sales. However, products are not placed in the same manner in an electronic commerce environment. Within an Internet-based marketplace it is not as simple as placing flower pots next to house plants and sales inherently flow. Sellers, or the Internet marketplace, may have certain knowledge of consumers who are interested in their products, but Internet-based stores lack the ability to target such consumers while they are actively viewing the marketplace website.

BRIEF DESCRIPTION OF THE DRAWINGS

FIG. 5 is a block flow diagram of a method according to an example embodiment.

FIG. 6 is a block flow diagram of a method according to an example embodiment.

DETAILED DESCRIPTION

Figure 1:
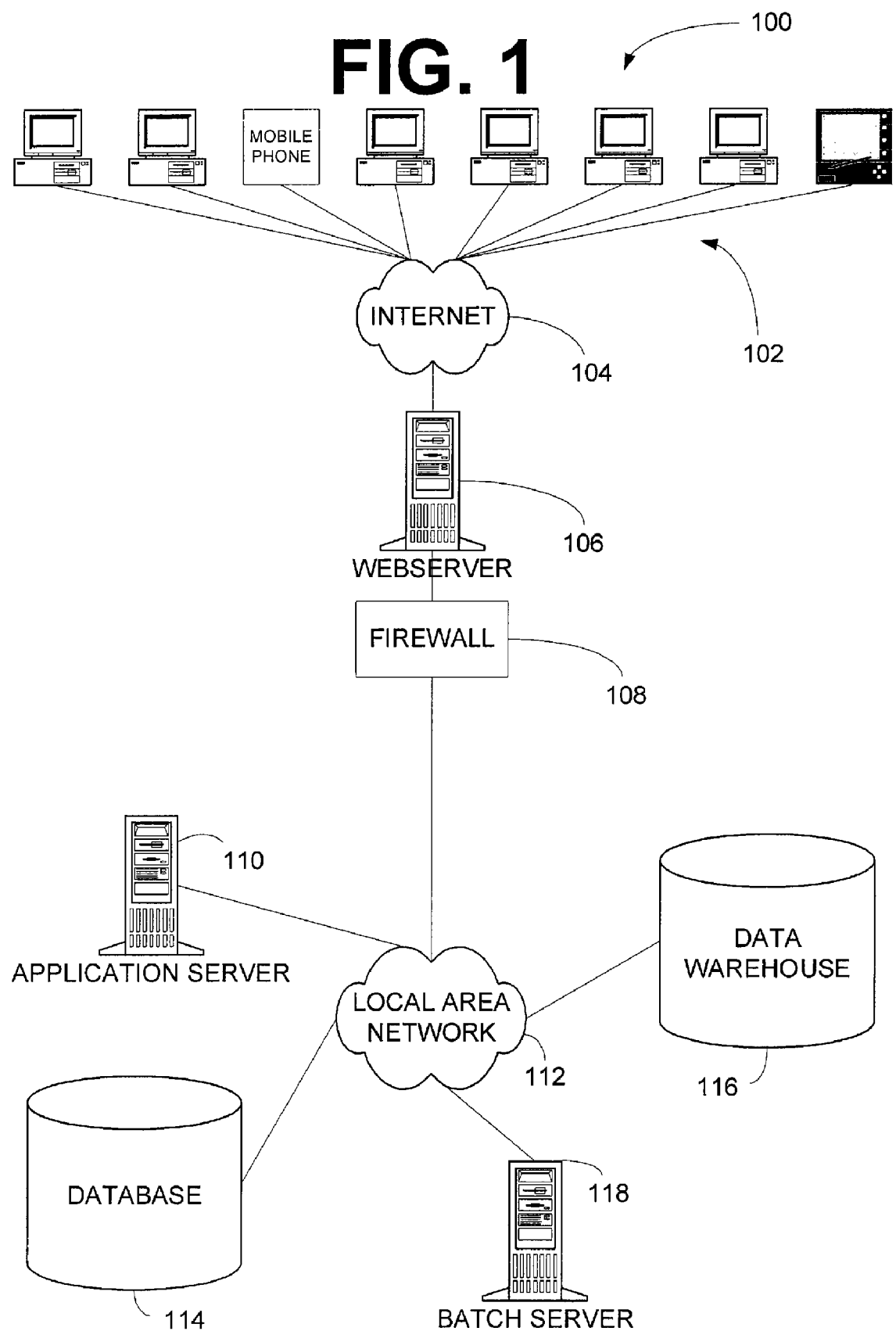
FIG. 1 is a block diagram of a system according to an example embodiment.

Various embodiments described below provide mechanisms, each including one or more of systems, methods, and software, that are useful in providing enhanced buyer and seller experiences within Internet-based marketplaces. The experience of buyers is enhanced by providing exposure to products and product search recommendations that buyers are more likely to be interested in. Seller experiences are improved by exposing seller products through one or both of product and search recommendations to the buyers who are more likely to be interested in the products. The hosts of such Internet marketplaces also benefit because the overall experience is improved to provide a more intelligent and adaptable marketplace meeting the needs and desires of both buyers and sellers.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a system 100 according to an example embodiment. The system 100 is operable to provide users an Internet marketplace within which to exchange, buy, and sell goods. The system 100 includes clients 102 connected to the Internet 104 or other network or networks providing data exchange services. The clients 102, in various embodiments, may include personal computers, mobile computing devices including mobile phones, smart phones, handheld devices, Internet enabled televisions, Internet television enabled set-top boxes, and other such devices capable of exchanging and displaying data communicated over a network, such as the Internet 104.

The system 100 also includes one or more web servers 106 connected to the Internet 104, or other networks, to receive and service client 102 data requests. The web server 106 also connects to a Local Area Network ("LAN") 112. A firewall 108 is logically located between the web server 106 and the LAN 112. The firewall 108 may be a standalone device or a piece of software operating on a server, such as web server 106, to prevent unauthorized access to resources available on the LAN 112. The LAN 112 may also include a system area network or other networks.

The LAN 112 also interconnects a database 114, a data warehouse 116, and a batch server 118. The database 114 holds data such as data defining user accounts, transactions, searches, demographic data, and other data that may be needed or collected through the operation of the Internet 104 marketplace. The data in the database is "production" data.

The data warehouse 116 includes data warehoused from the database 114. The data may be warehoused on virtually any periodic schedule, depending on the needs of the particular embodiment. The data in the data warehouse is commonly used for reporting purposes. Another use of this data is for analytical and product/entity marketing efforts. An entity may any organism that has a user account and is capable of performing actions. A holder of a user account may simultaneously be one or more of a buyer, a seller, a bidder, or other participant in the marketplace. In some embodiments, an entity may be a group account, such as an account of a corporation, and include two or more associated user accounts.

In some embodiments, the marketing efforts include collaborative filtering. Collaborative filtering is a mechanism by which predictions may be made about the interests of individual entities by collecting information from many entities. The underlying assumption of collaborative filtering is that those who have agreed, will agree again. For example, one application of collaborative filtering may make predictions of what music, or other products, product categories, searches, or other offerings, an entity may be interested in based on information of previous entity actions such as purchases, searches, demographics, and other entity transactions and information. These predictions are specific to the entity, but such predictions are made using information collected from many entities. As a result, information of products, services, searches, and other information may be specifically tailored to an entity that are more likely to generate further entity activity, such as purchases, than non-tailored information. In some instances, the information may provide a recommendation of a product an entity may be interested in, may not otherwise be aware of, or even an alternate product that the entity may be interested in purchasing instead a product being viewed. In further instances, the information may provide a search that is likely to net products of interest to the entity.

In some embodiments, an entity sets up an account by providing information that is stored in the database 114 and may also be warehoused in the data warehouse 116. An entity account typically includes information such as entity name, address, telephone number, and payment information. In some embodiments, an entity account may further include entity demographic information, information provided by the entity of product, service, manufacturer, brand, etc. likes, dislikes, preferences, favorites, and other information.

After an entity account is setup, the system 100 collects data from actions performed by the entity. The action data is recorded in the database 114 and warehoused in the data warehouse 116. The action data may include data representative of a specific system interaction such as product and service purchases, bids for products and services, watched and searched product and service offerings, and the like. In some embodiments, the action data may also include shopping lists, wish lists, inventory data of products owned, and information of product, service, and market reviews, guides, and other documentation downloaded or viewed. The action data may be recorded with date information to identify when the actions were performed. The date information may be mined for, or recorded, in a manner that season related, such as entity activity recorded or mined with an association to the Christmas, spring, or other season.

Recorded actions performed by an entity are performed with regard to one or more assets. Generally, an asset is an item with one or more properties that define the item for which a degree of relationship with other assets and entities may be identified. Assets may include products and services offered for sale within an Internet marketplace. As described herein, the terms "product" and "service" are used interchangeably. When either term is used, the other term is inherently included, unless otherwise specified. Assets may also include product categories, manufacturers, brands, contributors (e.g., a recording artist of an album, author of a book, designer, etc.), keywords, product seller or store within an Internet marketplace, and buyers. In some embodiments, a product contributor, or other asset defined within an Internet Marketplace may also include data identifying demographics of a market segment identified as likely having interest in the particular asset. Such demographic information may also be considered an asset. In some embodiment, an asset may even be a recommendation of another asset upon which action may be taken. For example, data may be captured on an action taken with regard to a product recommendation. In these, and other embodiments, an asset may be a search that is stored in the database 114 or data warehouse 116. Thus, assets can be virtually anything within the Internet 104 marketplace of FIG. 1 for which data exists or activities that are recorded. A search stored in a database of the Internet marketplace may also be an asset in some embodiments. In such embodiments, a search may be captured when submitted by an entity. The search may then be tracked when submitted by others and even recommended to entities.

As entities utilize the system 100, a record of entity actions performed against assets is built in the database 114. Periodically the entity-action-asset data is copied, or migrated, to the data warehouse 116. The entity-action-asset data is then available for one or more data-mining processes to identify relationships between two or more action-asset pairs performed by entities. Although the system 100 embodiment performs the data-mining activities against warehoused data, the same data-mining, in other embodiments, may be performed against live, production data, such as data stored in the database 114 or even a combination of the live data and warehoused data.

In some embodiments, the data-mining processes performed within the system 100 are performed by the batch server 118, although other embodiments include data-mining processes that execute on demand to service current entity Internet 104 marketplace sessions. The batch server 118 includes encoded instructions stored on a memory device that are executable by one or more processors of the batch server 118. The encoded instruction set enables the data-mining processes to connect to one or both of the data warehouse 116 and the database 114 to create, read, update, and delete data stored thereon. In typical embodiments, the data-mining process retrieves data from the data warehouse 116 and generates new data that may be stored in one or both of the data warehouse 116 and the database 114. The generated data includes data representative of identified relationships between action-asset pairs of entities.

In some embodiments, a data-mining process executes to generate statistics between a combinations of two or more action-asset pairs of unique entities that performed at least one of the action-asset pairs. The result is a probability of a certain action-asset occurrence with an actual occurrence of one or more other action-asset occurrences. For example:

Where all entities that performed action-asset pair Z—
50% also performed action-asset pair Y; and
45% also performed action-asset pair X.
Thus:
if an entity performs action-asset pair Z, there is a:
0.50 probability that the entity will also perform action-asset pair Y; and
0.45 probability that the entity will also perform action-asset pair X.

A representation of such probability models identified by the data-mining process is then typically stored, such as in the database 114 or in the data warehouse 116. In some embodiments, the data-mining process may take a time factor into account. For example, the action-asset pair probability relationships may be identified where an action-asset pair is performed, the probability is where the other action-asset pairs are also performed within a certain period, such as 90-days. The probability of an action-asset pair may also be the probability of the action-asset pair being performed during a certain season, such as a search for lawn and garden tools during the spring season. The data-mining process may execute against all action-asset pairs, action-asset pairs only of a certain type, such as a product category or a search action, actions performed within a certain proceeding period, or even where two or more action-asset are performed. For example:

Where all entities that performed action-asset pair Z and action-asset pair Y—
34% also performed action-asset pair X; and
23% also performed action-asset W.
Thus:
if an entity performs asset action pairs Z and Y, there is a:
0.34 probability that the entity will also perform action-asset pair X; and
0.23 probability that the entity will also perform action-asset pair W.

Some embodiments expand further from this ranking of action probabilities. One example embodiment includes weighting of probabilities for various purposes. These purposes may include weighting products from particular sellers in exchange for a fee payable by the seller to the Internet 104 marketplace. Another purpose may be to draw a particular entity into viewing different product types than the entity has previously viewed. This weighting may be applied globally to all entities for promotional or seasonal purposes as well. In some embodiments, the weighting may be applied to products of a certain category during a certain season for entities residing in a particular area. For example, all products in a gardening tool category are weighted higher in during the first two weeks of April when an entity's demographic data indicates the entity resides in an area with a Zip Code beginning with the first two numbers "55" or in one of the states Minnesota, Iowa, Illinois, Wisconsin, South Dakota, and Nebraska.

In some embodiments, the data-mining process may identify action-asset pairs that are related to data that is conceptually action data within the system 100, but is not inherently action data. This may include entity demographic data. For example, relationships my be identified between entities living in a certain region and certain products. A simple example relationship is where entities reside in Canada, there is a 0.75 probability that the entity will be interested in product category "snow removal equipment." Other demographic information, or combinations of demographic information, may be related to assets as well. However, in such instances demographic data may be logically considered to be the same as an action when the data-mining process executes to identify relationships. At the same time, a search may be considered an asset such as a search for "snow blowers." Thus, what is considered an action or asset may vary from embodiment to embodiment, or even by context within a single embodiment.

After probability models of the action-asset pairs are generated and stored, one or both of an asset recommendation process and a search recommendation process may utilize these models. In some embodiments, these processes are offered through one or more services of one or more objects. In other embodiments, the processes may be or include one or more stored procedures within the database 114, a procedure that executes on the application server 110 and retrieves data from one or both of the database 114 and the data warehouse 116, or processes that execute elsewhere within the system 100.

In some embodiments, an asset recommendation process receives one or more arguments when called. The arguments may be considered retrieval arguments and may include one or more of an action-asset pair representation, two or more action action-asset pairs, an identity identifier, a product category identifier, a submitted search, an Internet 104 marketplace session identifier, or other data of the entity, an asset, or a time period. The asset recommendation process, in response to a recommendation request, may provide one or more asset recommendations. An asset recommendation may include data formatted for inclusion in a webpage, data references to one or more assets or asset searches, or other data that identifies one or more assets which may include products, asset categories, contributors, and others.

In some embodiments, a search recommendation process receives one or more arguments when called. The arguments may be considered retrieval arguments and may include one or more of an Internet 104 marketplace session identifier, an entity identifier, an asset identifier, a search submitted by an entity, a product category identifier, a contributor identifier, entity demographic information, or other data. The search recommendation process may then utilize that data to identify one or more other searches within which an entity is likely to have an interest. In some embodiments, the search recommendation process may be called upon the occurrence of an event. The event, in some such embodiments, is a search that yields a large number of results, few results, or no results. In such instances, the search recommendation process may recommend refined searches to yields a more manageable number of search results or more search results.

Figure 2:
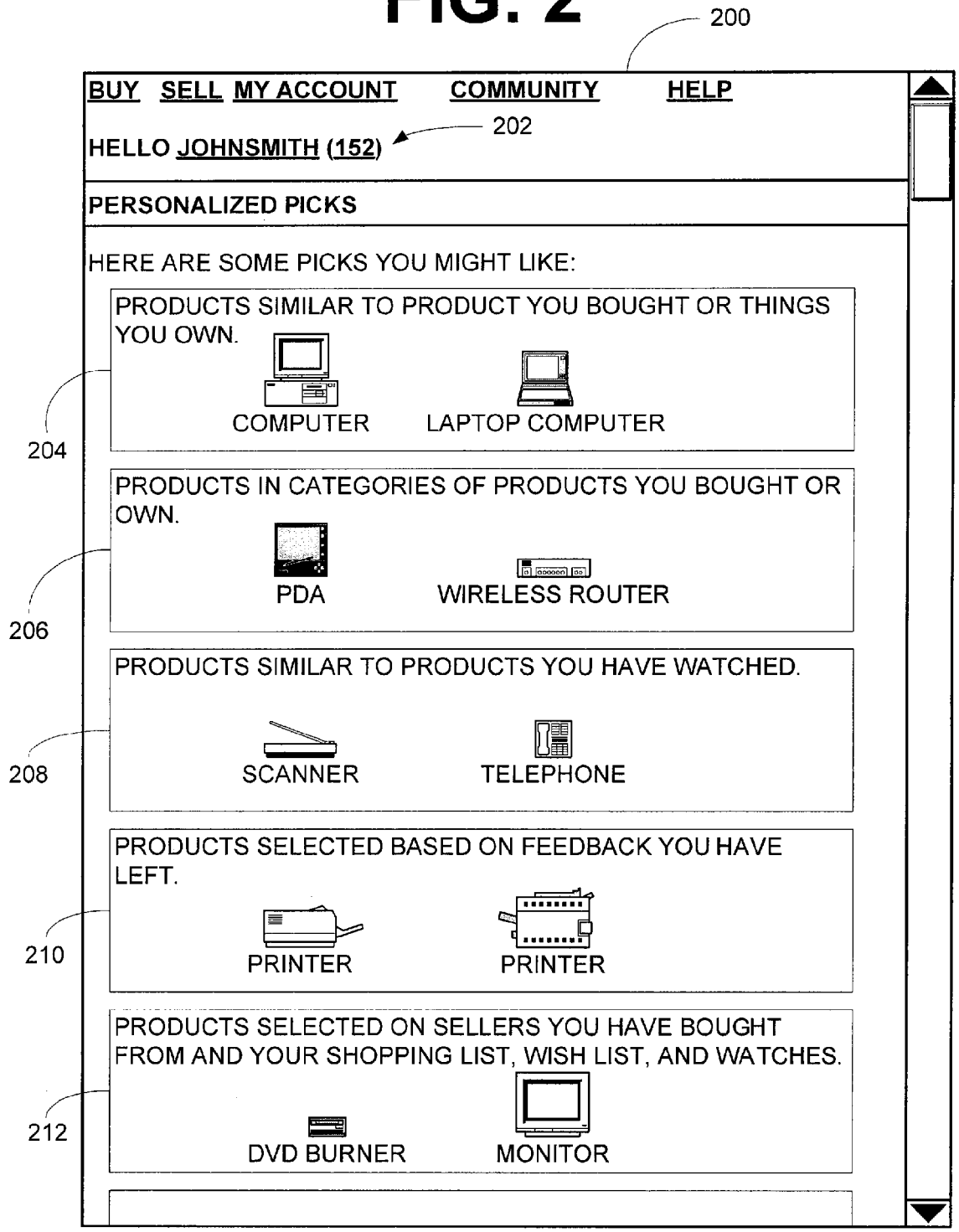
FIG. 2 is a user interface illustration according to an example embodiment.

FIG. 2 is a user interface illustration according to an example embodiment. The example user interface of FIG. 2 is a webpage 200. The webpage 200 includes a reference 202 to an entity account and recommendation portions 204, 206, 208, 210, 212 that may be included and populated with differing types of asset recommendations. Other example user interfaces may include one or more of the illustrated recommendation portions 204, 206, 208, 210, 212, or one or more specific asset recommendations. The illustrated asset recommendations recommend specific products. However, other recommendation portions and specific asset recommendations may reference product categories, specific product sellers or stores, product reviews, product keywords, searches, and asset contributors such as artists, designers, architects, producers, directors, etc. Even further recommendations may recommend other assets, asset metadata, buying guides, special offers, searches, searches in view of special offers, and the like. Conceptually, anything within an Internet marketplace for which data is maintained or captured may be the subject of a recommendation. In some embodiments, this may even include recommending entities having a probability, such as a probability greater than a threshold, of having interest in the offerings of another entity.

Figure 3:
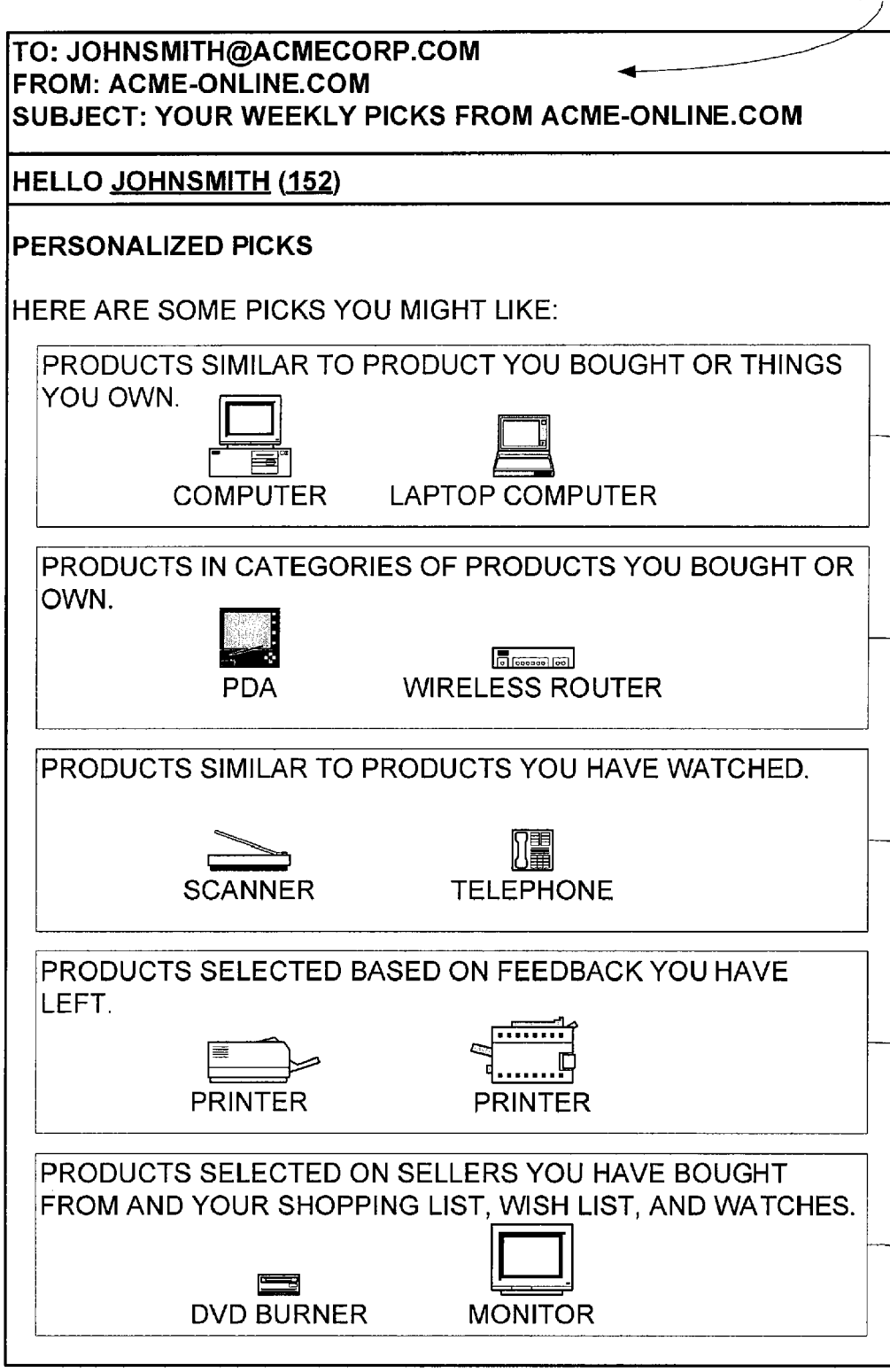
FIG. 3 is an electronic message illustration according to an example embodiment.

FIG. 3 is an electronic message 300 illustration according to an example embodiment. The example electronic message 300 includes header information 302 identifying an addressee, a sender, and a subject. The body of the electronic message may include one or more recommendation portions 304, 306, 308, 310, 312, and others. The recommendation portions are generally the same as the recommendation portions 204, 206, 208, 210, 212 of FIG. 2, differing mainly by the mode of delivery. The electronic message 300 may be sent as part of marketing efforts by an Internet marketplace, by an entity offering products in the Internet marketplace, or by other or for other purposes. Electronic messages 300 may be generated as a function of recommendations received from a recommendation process. The recommendation process may be provided with input such as an entity identifier where the entity offers products within the Internet marketplace and the recommendation process identifies other entities that may have an interest in the offerings. In some embodiments, the electronic message may be generated upon the occurrence of an event. The event may be a lapse of a period of time since an entity submitted a search. The email may include a recommendation of the same search o one or more other searches related to that search or products viewed, or other actions performed by the entity in the session within which the original search was performed. The result is electronic messages 300 targeted and sent specifically to entities with at least a minimum probability of interest.

Figure 4:
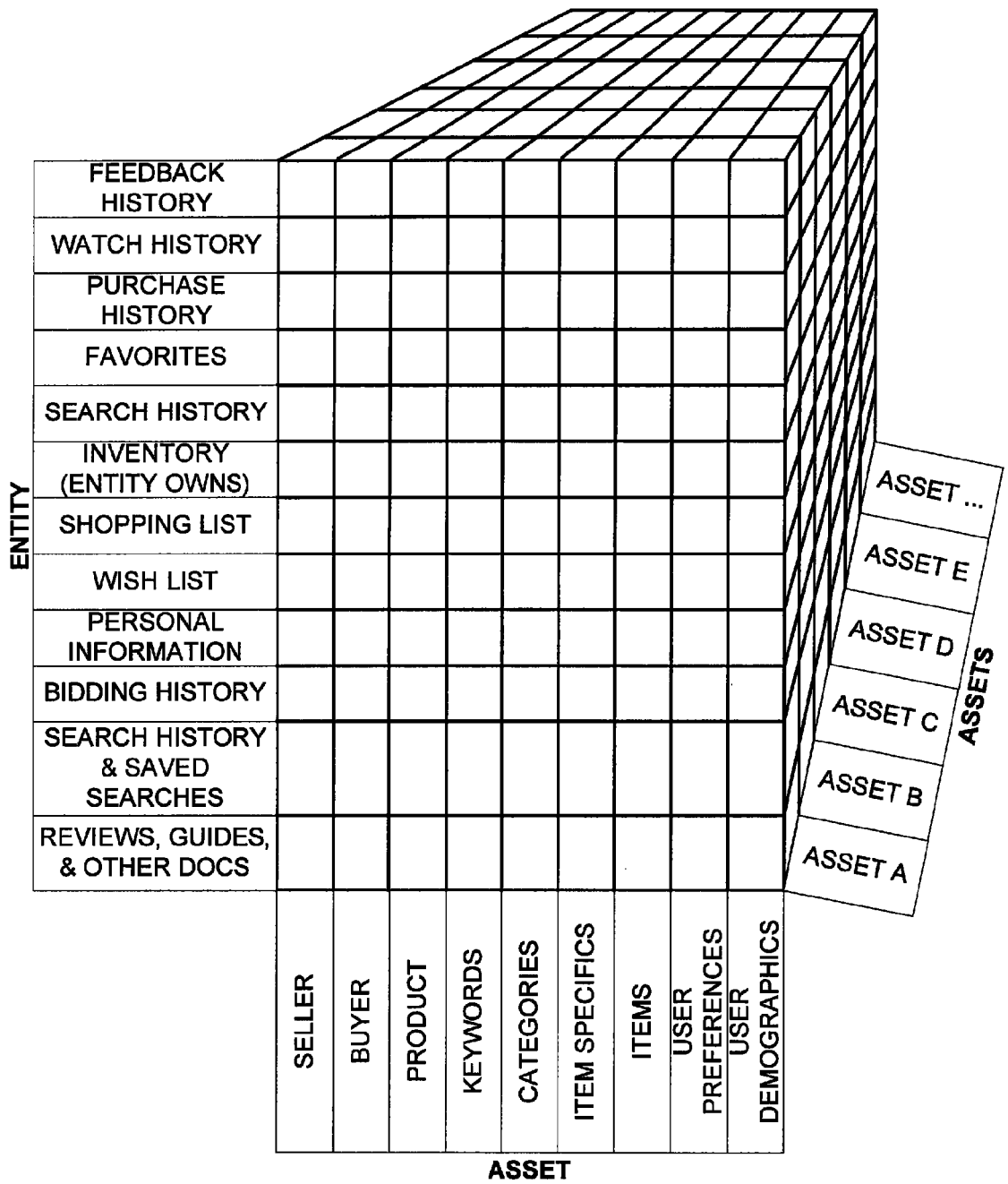
FIG. 4 is a logical diagram of a dataset according to an example embodiment.

FIG. 4 is a logical diagram of a dataset according to an example embodiment. The dataset includes cubes of data. The cubes of data may be of two types. The first cube type includes a representation of an action performed by an entity in relation to an asset. The second cube type includes a representation of a probability that an entity will perform an action with regard to an asset. For example, the probability that an entity will place a watch on a particular asset or category of assets.

The data of the dataset may be stored in a set of database tables within a database, data warehouse, or other data store. The data of the first cube type is historical transaction data from the actual entity activity within an Internet marketplace. The data of the second cube type is derived from the historical transaction data and stored in the database tables of the dataset. The data of the second cube type, in some embodiments, is derived by one or more data mining processes as described above with regard to FIG. 1. The dataset, once assembled, may then be used to generate asset and search recommendations for entities. The asset recommendation may be provided though services of one or more objects that execute against the dataset, through stored procedures of the database or data warehouse holding the data, through programmatic queries against the dataset, or other mechanisms depending on the specifics of the particular embodiment.

In some embodiments, the one or more data mining processes operate to identify relationships between data and calculate probabilities of future entity actions performed against attributes of assets. The examples above in the terms of action-asset pairs W, X, Y, and Z are applicable here as well. However, more concrete examples follow.

Feedback History

In some embodiments, probabilities of future entity actions are calculated based in part on feedback entities have provided with regard to assets and asset attributes. Some of these embodiments take into account a factoring value indicating a degree of asset or asset attribute satisfaction.

In some feedback history embodiments, is used to weight asset recommendations. In such embodiments, the feedback history includes an asset satisfaction value that represents entity satisfaction with a particular asset. For a given asset, the satisfaction values may be averaged to get a better picture of overall asset satisfaction instead of that of just a few disgruntled or extremely satisfied entities. The average asset satisfaction can then be factored against a probability of an entity performing an action to enhance the product recommendations. The result, in some embodiments, is that recommendations provided to an entity are not only for assets in which the entity is likely to have an interest, but assets for which the entity will be more likely to be satisfied with. Consider assets A and B:

Where:
50% of entities that purchased A also bought B
40% of entities that purchased B also bought A
0.6 average satisfaction with A
0.8 average satisfaction with B
Therefore:
weighted probabilities:
that an entity that purchased A will also purchase B=0.5*0.6=0.30
that an entity that purchased B will also purchase A=0.4*0.8=0.32

The result of this weighting can be that even though a certain asset may be lesser interest, assets for which an entity is more likely to be dissatisfied with will be less likely to be recommended.

In some embodiments, the feedback history of an entity is utilized to determine entity probabilities of interest in assets. For example, an entity may leave feedback for a particular asset. In this scenario, the feedback is an action by an entity with regard to an asset. Such an entity action-asset pair may be utilized by a data-mining process, as discussed above, to identify probabilities of action-asset pairs with regard to the specific entity in view of action-asset pairs of other entities. In some embodiments, an indicated degree of satisfaction in the feedback history may be taken into account. For example, the action of the entity action-asset pair may be positive feedback rather then just simply feedback. The result is a further refined action with regard to assets that may be likely to yield a more accurate probability of likely entity interest.

Watch History

In some embodiments, the data-mining processes as discussed above, operate to determine probabilities of action-asset pairs in view of watch history actions. A watch history action may include adding product offerings to a list of products that will be monitored by processes within an Internet marketplace for an entity. The watching of a product may cause information of watched products to be displayed to a user within an Internet marketplace when an entity enters the Internet marketplace, within an entity account detail interface, in emails sent to an entity, or elsewhere and by other means. The product information provided to the entity may include product price or current bid amount, sale end date, selling entity information, and other data relevant to the product being watch. In some embodiments, a watch may be placed on a category of products, all offerings of a particular product within an Internet marketplace, offerings of a particular selling entity, or other product and entity watches.

In such embodiments, a watch is indicative of entity interest in a certain product, category, selling entity, or other unit of data in an Internet marketplace. A watch is an action that may be correlated to the asset being watched. Note that the line between entity and asset may be blurred a little where the product offerings of a particular selling entity are watched.

These watch embodiments operate on the premise that an entity who adds a product watch has interests similar to other entities that have added a watch, or performed other actions showing an interest in the product to be watched. Thus, interest of the entity may be determined based on action-assets pairs of the other entities who have shown an interest in the product to be watched.

Purchase History

Probably the most simple type of recommendation that may be made is a "bought this, bought that" type of recommendation. The concept here being that where an entity bought item x, of all other entities that bought item x, what other product was most frequently purchased by those entities. This is a very simple query that may be made to obtain a potential product recommendation. However, other recommendations may be made based on the purchase history of an entity. For example, more refined recommendations may be made based on categories of products purchased or recommendations of products in certain categories as a function of one or more products purchased.

In some embodiments, one or more products purchased by an entity may be taken into account to determine probabilities of one or more categories of interest to an entity. The one or more categories may be different categories than the categories of the purchased products. An example might be where an entity purchased tulip bulbs from a category "plants" and a trowel from a category "gardening tools." A data-mining process, as discussed above, may operate to identify that where the purchase history of an entity includes products purchased from categories "plants," the entity is likely to have an interest in categories "gardening tools" and "fertilizers." Thus, the entity, at virtually any point within an Internet marketplace, based on purchase history, may receive such category recommendations.

Some embodiments may also take into account such categories to recommend searches. A search recommendation may be made to a user when viewing certain products, such as tulip bulbs. Such a search may target other products that an entity purchasing such a product may also need. For example, a search recommended to an entity viewing tulip bulbs may recommend a search for products within the category "fertilizers."

In some such embodiments, the recommended searches may also take into account the season. Certain categories of products may have a probability of being purchased during certain times of the year. The category mentioned above, "gardening tools" may be commonly purchased during the spring, but be less likely to be purchased other times of the year. Thus, product categories and product category searches may be recommended only during time of the year when products in such categories are most likely to be of entity interest.

In such embodiments, the data-mining processes may operate in a two steps. The first step may be to identify probabilities between action-asset pairs of entities and categories of action-asset pairs of other entities. The second step may operate to identify a probability that a product or product category will be purchased on a given day, within a given month, or other period. The results of each step may be combined and sorted by highest probability to identify product categories or product category searches to recommend.

In some embodiments, the product and search recommendations may be even further refined to take into account not only categories, but also specific attributes of products in an entities purchase history. For example, an entity may have tulip bulbs in the purchase history. The data-mining process may identify a relatively high interest in a product category "flower bulbs" and product specific data of the purchased bulbs may specify "early spring blooms." Thus, the data-mining processes may identify a relatively high interest in other products within the flower bulbs category with item specific data specifying "summer blooms." As a result, the entity may receive product or search recommendations of products from the "flower bulbs" category with item specific data indicating "summer blooms." Other recommendations may be identified and made based on item specific data, such as where item specific data indicates a product is compatible with another product already purchased or owned by an entity, or even if the entity has just shown an interest in a product based on one or more other actions.

In some embodiments, the purchase history of an entity may be processed by the data-mining processes to identify entities that offer products for sale within an Internet marketplace that entity is likely to have an interest in. Entities that offer products for sale within an Internet marketplace may also be referred to as "sellers." In some embodiments, sellers that an entity is likely to have interest in may be identified based on one or more purchases by the entity of products from the seller. Sellers of likely interest may also be identified by identifying action asset-pairs of the entity in view of action-asset pairs of other entities that have purchased products from sellers. This is a similar process as that of identifying products an entity is likely interested in, but the asset in these embodiments is a seller instead of a particular product.

Similar to viewing sellers as assets instead of specific products, other items of data recorded and maintained within an Internet marketplace may also be considered assets for which recommendations may be made. Such recommendations may be made as specific asset recommendations or search recommendations. Not only may products and sellers be considered assets, but also buyers, categories, contributors including artists, designers, and the like may be viewed by data-mining processes as assets. This flexibility in the data-mining processes allows recommendations to be generated and made based on virtually any data that may be recorded within an Internet marketplace.

Search Recommendations

In some embodiments, as briefly described above, search recommendations may be provided to entities within an Internet marketplace. Search recommendations may take into account many different types of information.

For example, if an entity, in a current Internet marketplace session, has performed a search, further search recommendations may be made as a function of one or more submitted queries. If an entity is searching product listing for "Hofner Bass" and the search results result in zero results, other searches may be recommended that will yield results. However, recommended searches are made based on data of other entities that have performed the same or similar search to provide one or more recommended searches that are likely to yield product listings the entity is likely to have an interest in. The recommendation will not be made simply to yield results. One recommended search may be "Gibson—Les Paul Money Bass" where the recorded data in the Internet marketplace shows a probability of interest in a "Gibson—Les Paul Money Bass" when an entity also has shown an interest in a "Hoftier Bass."

In another example, where an entity performs a search that yields a large number of results, further search recommendations may be made that will yield a smaller number of results. Again, the recommended searches are recommended based on a probability of the entity's interest in the likely results of the recommended searches. More particularly, if an entity submits a search for "Fender Guitar," the number of results within the Internet marketplace may be over 9,000. One or more processes of the Internet marketplace may then be called to identify one or more other searches that yield fewer results and the results are of likely interest to the entity based on one or more of current session data, entity purchase history, entity demographics, and other entity action-asset data in view of action-asset data of other entities.

Thus, recommended searches may include "Fender American Stratocaster," "Fender Stratocaster guitar," "USA Fender Stratocaster deluxe whammy bar," and "Fender Stratocaster SRV Stevie Ray Vaughn Guitar." In some embodiments, these recommendations may be based specifically on other entity data, such as the "Fender Stratocaster SRV Stevie Ray Vaughn Guitar" where the purchase history of the entity included a purchase of a compact disk with a contributor identifier of artist "Stevie Ray Vaughn." The recommendations may also be based on entities who searched for Fender guitars were most likely to purchase a Fender Stratocaster.

Favorites

In some embodiments, asset recommendations may be made as a function of sellers identified by an entity as favorites. In such embodiments, the data associated with an entity may include favorite sellers. An entity may choose to identify a seller as a favorite for any number of personal reasons, but common reasons may include previous good experiences with a seller, product offerings by the seller, reasonable pricing by the seller, and reasons.

In some such embodiments, asset recommendations may be made utilizing identified favorite sellers. Such recommendations may be made by identifying assets offered by one or more sellers identified as favorites and determining a probability of entity interest in the products. The probability of interest in products offered by a favorite seller may take into action-asset data associated with non-favorites sellers. However, the probability of an entity's interest may be determined in any number of ways.

For example, of all the assets offered by the favorite sellers, an entity's probability of interest may be determined for each offering. This may include looking at action-asset history of the entity and comparing it to action-asset histories of other entities. In other embodiments described herein, the probability of an entity's interest is determined as a function of an action-asset pair of record for the entity. However, in some favorite seller embodiments, the asset offerings of one or more sellers are the starting point. Each asset and an entity identifier may be provided to a process that identifies a probability the entity is interested in performing any, or a specific, action against the asset. This may yield a probability of the entity's likelihood to purchase the asset. Then, based on the probabilities of the entity to perform an action against the favorite seller asset offerings, one or more assets may be recommended to the entity.

In some embodiments, other data may also be identified as a favorite. This may include marking a category of products as a favorite, a contributor such as an artist, designer, etc., or even a search. In such embodiments, virtually any data may be marked as a favorite and later referenced to find products associated with that favorite.

In these, and other embodiments, a probability of an entity performing an action may also include the action of adding a seller as a favorite seller. Such determinations may be made in the same manner as other action probability determinations as described above.

Reviews, Guides, and Other Documentation

An entity may show interest in assets in any number of ways. Interest may be shown by searching, viewing, adding assets to watch, wish, or shopping lists, and even downloading or viewing reviews, guides, and other documentation related to an asset. These actions may be recorded with regard to the particular asset. The results is an action-asset pair associated to an entity. The data-mining processes, as described herein, may then used these additional action-asset pairs to identify other products and searches to recommended to entities.

Other Action-Asset Pairs

Other action-asset pairs may be recorded for entities, in various embodiments. This may include recording an action of "owned" with regard to a product to keep an inventory of products owned by entities even if the products were purchased elsewhere. Other actions may include adding one or more of assets and asset categories to shopping lists, wish lists, and the like. Another action may include saving a search. These actions may then be then be utilized by the data-mining processes to identify assets and search of likely interest to the entity and other entities.

Search Recommendations

Some search recommendation embodiments have been described above. Some of these embodiments, and others, operate to make recommendations of searches likely yield results including assets in which an entity will have an interest. Identifying searches to recommend commonly looks at searches submitted by other entities.

In some such embodiments, searches submitted by users are recorded and stored in an Internet marketplace system. A search recommendation process may then evaluate all or part of the record of searches to identify common searches. In some embodiments, the record of searches is further evaluated in view of recorded entity actions following presentation of search results. The further evaluation may include counting the number of times the results of a search yields:
  an asset view;
  a bid;
  a purchase;
  a watch list addition;
  a wish list addition;
  a forwarding of the listing to a friend;
  an addition of the search to a favorite search list; and
  other actions.

In some embodiments, such as when a recommended search yields a bid or a purchase, a dollar amount of the bid or purchase is also taken into account by the search recommendation process. These and other embodiments may also take into account recommended searches that yield fees payable to the Internet marketplace by a seller.

When a search recommendation is needed, these counts may then be used to identify searches to recommend to an entity. In some embodiments, searches to recommend are identified based on several factors. These factors may include current Internet marketplace session information of an entity, entity demographic information, entity action histories, and the like. This information may be used to identify searches of interest. However, there may be many searches of interest. Each search of interest may then be weighted using the search evaluation data described above. The weighting of the searches is used in such embodiments to rank the searches of interest.

In some embodiments, five searches are recommended. The first two searches are the highest rated searches from the weighting. The other three recommended searches are selected at random from the remaining searches of interest. The randomly selected searches are utilized to generate training data for the search recommendation process. If the randomly selected searches of interest yield entity action, the searches become more likely to be included in other search recommendation list. Thus, in some embodiments, the search recommendation process is adaptive. Although five search recommendations are made in this embodiment, other numbers of recommendations may be made and the number of top search results and training search results may be varied based on the needs of the particular embodiment.

In embodiments that include tracking of entity Internet marketplace sessions, actions taken can be related to previous actions to determine which actions lead to further actions. For example, a search for "fender guitar" may result in a View of item 123456 "Fender stratocaster guitar, new", followed by a bid. These actions may further be qualified by the item category in which they occurred (e.g. ViewItem and Bid happened in category "Musical Instruments>Guitar>Electric>Fender>Stratocaster>American").

The utility of the actions taken may be aggregated. The utility include may include the factors mentioned above, such as the counts of the various actions, price, fee to the Internet marketplace, etc. The result is a set of historic data that is stored in a database containing a list of queries submitted by entities, and associated with each query, is a list of likely actions in asset-category pairs with an associated utility score. This data may be accumulated and consolidated into the database on a periodic basis, such as daily.

In such embodiments, a subsequent search recommendation request may be received including at least an entity's query, an indication of a need for refinement if there are too many search results or an indication of a need for search expansion if there are too few search results. Other factors may be added in further embodiments, such as entity demographics, interests, and other data specific to the entity.

Search recommendations may ten be derived from the original search request and scored. The score is derived from the utility scores associated with action-category pairs related to each candidate query in the database of historic searches. Scores across actions, and across periods (e.g. days) may then be combined heuristically. For example, to capture changing trends, more weight is given to recent actions. Queries with higher scores receive priority in the search recommendations. However, some embodiments may include randomness to facilitate training of historic queries to allow the search recommendation processes to be adaptive to changing market trends due to preference and seasonal changes.

The search recommendation process, may also take into account time periods. The time periods may be a number of days, weeks, or months within which actions utilized to weight various searches are taken into account. In some of these, and other embodiments, the search recommendation process also accounts for seasons, such as the Christmas season. In such seasons, search recommendation weighting may vary to take into account data recorded for search recommendation weighting from the same season in one or more previous years. As a result of this periodic weighting, the search recommendation process, in such embodiments, is adaptive to seasonal and market trends.

In some embodiments, the search recommendation process weights the counts of entity actions with regard to a search differently by category. In some embodiments, certain action counts may be identified by an Internet marketplace administrator, or by a process, as more helpful in predicting entity interest than other action counts. These counts may differ category to category. For example, a search in the category "automobiles" may generate a lot of product views, but very few purchases. Thus, in the category "automobiles," product view actions would be weighted low while product purchase actions would be rated high. Another search in the category "Beatles lunch boxes" may yield a nearly identical number of purchase actions and view actions. Thus, in the category "Beatles lunch boxes," product view actions are highly likely to lead to a product purchase action. Product views are then weighted high. In such embodiments, the search recommendation process is not only adaptive to market and seasonal trends, but also to trends between products.

FIG. 5 is a block flow diagram of a method 500 according to an example embodiment. The example method 500 include collecting transaction data of actions with regard to assets performed by entities 502 and storing the transaction data in a database 504. The method 500 also include executing a data-mining process against the transaction data to identify relationships between two or more action-asset pairs performed by entities 506 and storing a representation of each relationship identified by the data-mining process in an asset recommendation database 508.

In some embodiments, the action may be one or more of a purchase, a bid, a watch, a search for, adding an asset to a watch, wish, or favorite list, or other action relevant to an Internet marketplace. The asset, in various embodiments, includes a product, a service, a category of products or services, keywords that may be used to identify one or more assets, demographics, buyers, sellers, searches, and other items that may be offered or used to identify or may be associated with other assets.

FIG. 6 is a block flow diagram of a method 600 according to an example embodiment. The example method 600 is an example asset recommendation process that may be implemented within an Internet marketplace to recommend assets and/or searches an entity is likely to have an interest in. The method 600 includes receiving an asset recommendation request including one or more retrieval arguments 602 and retrieving one or more asset representations from the asset recommendation database as a function of the one or more retrieval arguments 604. The asset recommendations are then returned 606.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method comprising:
   maintaining a database, the database including:
     asset records, each asset record including data descriptive of one or more asset attributes;
     entity records, each entity record including data descriptive of one or more entity attributes;
     transaction records, each transaction record including a relationship to one or more entity records, a relationship to an asset record, and data of one or more actions with regard to the asset record, at least one of the actions being associated to one of the one or more entity records; and
     feedback records, each feedback record including:
       a relationship to a transaction record; and
       feedback data provided by one of the entities represented by an entity record associated with the transaction record, the feedback data including a degree of the entity's satisfaction with the asset of the transaction record; and
   executing an asset satisfaction data-mining process against the feedback records to determine an overall level of entity satisfaction with at least some of the assets for which feedback has been received, the executing of the asset satisfaction data-mining process being executed by a module implemented by a hardware processor;
   executing an asset-relation data-mining process against the transaction records to identify relationships between two or more action-asset pairs performed by entities, wherein a relationship between action-asset pairs performed by the entities is identified as a probability of a combination of the two or more action-asset pairs being performed by an entity that performed at least one of the two or more action-asset pairs; and
   weighting the probability of the combination of the two or more action-asset pairs by a determined degree of satisfaction with a corresponding asset as determined by the asset satisfaction data-mining process.

2. The method of claim 1, wherein one or more entities is a registered user of a user account.

3. The method of claim 1, wherein one or more of the actions includes a purchase of an asset.

4. The method of claim 1, wherein one or more assets includes a product offered for sale.

5. The method of claim 1, wherein the database is a data warehouse.

6. The method of claim 1, wherein representations of the relationships identified by the asset-relation data-mining process are stored in an asset recommendation database with the weighted probabilities.

7. The method of claim 6, further comprising:
   executing an asset recommendation process, wherein the asset recommendation process:
     receives an asset recommendation request including one or more action-asset pairs received as retrieval arguments;
     retrieves one or more asset representations from the asset recommendation database as a function of the retrieval arguments; and
     returns the retrieved asset representations.

8. The method of claim 1, further comprising:
   collecting entity demographic data and storing the demographic data in the database;
   wherein the asset-relation data mining process further executes against the demographic data and transaction data to identify relationships between one or more entity demographic characteristics represented in the demographic data and one or more action-asset pairs.

9. The method of claim 1, further comprising:
   executing a replacement product recommendation process that includes:
     identifying an entity action-asset pair of an asset where the action indicates the entity owns the asset and the entity provided negative feedback regarding the asset;
     identifying assets similar to the asset for which the entity provided negative feedback; and
     providing a recommendation of the similar assets to the entity.

10. A system comprising:
    a database configured to include:
      asset records, each asset record including data descriptive of one or more asset attributes;
      entity records, each entity record including data descriptive of one or more entity attributes;
      transaction records, each transaction record including a relationship to one or more entity records, a relationship to an asset record, and data of one or more actions with regard to the asset record, at least one of the actions being associated to one of the one or more entity records; and
      feedback records, each feedback record including:
        a relationship to a transaction record; and
        feedback data provided by one of the entities represented by an entity record associated with the transaction record, the feedback data including a degree of the entity's satisfaction with the asset of the transaction record; and
    a module implemented at least in part by a processor, the module being configured to:
      execute an asset satisfaction data-mining process against the feedback records to determine an overall level of entity satisfaction with at least some of the assets for which feedback has been received;
      execute an asset-relation data-mining process against the transaction records to identify relationships between two or more action-asset pairs performed by entities, wherein a relationship between action-asset pairs performed by the entities is identified as a probability of a combination of the two or more action-asset pairs being performed by an entity that performed at least one of the two or more action-asset pairs; and
      weight the probability of the combination of the two or more action-asset pairs by a determined degree of satisfaction with a corresponding asset as determined by the asset satisfaction data-mining process.

11. A non-transitory machine-readable storage medium comprising instructions that, when executed by one or more processors, cause the one or more processors to perform a method comprising:
    maintaining a database, the database including:
      asset records, each asset record including data descriptive of one or more asset attributes;
      entity records, each entity record including data descriptive of one or more entity attributes;

transaction records, each transaction record including a relationship to one or more entity records, a relationship to an asset record, and data of one or more actions with regard to the asset record, at least one of the actions being associated to one of the one or more entity records; and feedback records, each feedback record including:
  a relationship to a transaction record; and
  feedback data provided by one of the entities represented by an entity record associated with the transaction record, the feedback data including a degree of the entity's satisfaction with the asset of the transaction record; and executing an asset satisfaction data-mining process against the feedback records to determine an overall level of entity satisfaction with at least some of the assets for which feedback has been received;

executing an asset-relation data-mining process against the transaction records to identify relationships between two or more action-asset pairs performed by entities, wherein a relationship between action-asset pairs performed by the entities is identified as a probability of a combination of the two or more action-asset pairs being performed by an entity that performed at least one of the two or more action-asset pairs; and weighting the probability of the combination of the two or more action-asset pairs by a determined degree of satisfaction with a corresponding asset as determined by the asset satisfaction data-mining process.

* * * * *

UNITED STATES PATENT AND TRADEMARK OFFICE
CERTIFICATE OF CORRECTION

PATENT NO.      : 8,050,998 B2
APPLICATION NO. : 11/740352
DATED           : November 1, 2011
INVENTOR(S)     : Alvaro Bolivar et al.

It is certified that error appears in the above-identified patent and that said Letters Patent is hereby corrected as shown below:

On the Title page, in Item (57), under "Abstract", in column 2, line 1, delete "mater" and insert -- matter --, therefor.

On page 3, under "Other Publications", in column 1, line 15, delete "Aution" and insert -- Auction --, therefor.

On page 3, under "Other Publications", in column 1, line 26, delete "corss" and insert -- cross --, therefor.

On page 3, under "Other Publications", in column 2, line 13, delete "Commerence" and insert -- Commerce --, therefor.

On page 3, under "Other Publications", in column 2, line 29, delete "Ststems" and insert -- Systems --, therefor.

On page 3, under "Other Publications", in column 2, line 31, delete "Artifical" and insert -- Artificial --, therefor.

On page 3, under "Other Publications", in column 2, line 31, delete "(AAA1" and Insert -- (AAAI --, therefor.

On page 3, under "Other Publications", in column 2, line 50, delete "J ," and insert -- J., et al., --, therefor.

On page 3, under "Other Publications", in column 2, line 53, after "GroupLens" delete "&".

On page 3, under "Other Publications", in column 2, line 58, after "I.," delete "et al.,".

On page 3, under "Other Publications", in column 2, line 68, delete "FazIollahi," and Signed and Sealed this
Third Day of January, 2012

David J. Kappos
*Director of the United States Patent and Trademark Office* insert -- Fazlollahi, --, therefor.

In column 1, line 6, delete "mater" and insert -- matter --, therefor.

In column 5, line 61, delete "my" and insert -- may --, therefor.

In column 11, line 3, delete "Hoftier" and insert -- Hofner --, therefor.

In column 13, line 49, delete "ten" and insert -- then --, therefor.